United States Patent
Wake et al.

(10) Patent No.: US 10,073,433 B2
(45) Date of Patent: Sep. 11, 2018

(54) NUMERICAL CONTROLLER OPERATING BASED ON TABULAR DATA

(71) Applicant: FANUC Corporation, Minamitsuru-gun, Yamanashi (JP)

(72) Inventors: Yoshifumi Wake, Minamitsuru-gun (JP); Akira Kanemaru, Minamitsuru-gun (JP); Yasushi Takeuchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 251 days.

(21) Appl. No.: 15/098,402

(22) Filed: Apr. 14, 2016

(65) Prior Publication Data

US 2016/0313720 A1 Oct. 27, 2016

(30) Foreign Application Priority Data

Apr. 21, 2015 (JP) .................................. 2015-086642

(51) Int. Cl.
 *G06F 19/00* (2018.01)
 *G05B 19/19* (2006.01)

(52) U.S. Cl.
 CPC .... *G05B 19/19* (2013.01); *G05B 2219/34004* (2013.01); *G05B 2219/34015* (2013.01)

(58) Field of Classification Search
 CPC .................................................. G05B 19/4103
 USPC ........................................................ 700/186
 See application file for complete search history.

(56) References Cited

U.S. PATENT DOCUMENTS

| 4,692,856 | A |   | 9/1987 | Komiya |   |
|---|---|---|---|---|---|
| 4,873,793 | A |   | 10/1989 | Asano et al. |   |
| 5,367,238 | A | * | 11/1994 | Sakamoto | G05B 19/404 318/630 |
| 7,003,373 | B2 | * | 2/2006 | Baumann | G05B 19/408 318/573 |
| 7,852,031 | B2 | * | 12/2010 | Hon | G05B 19/402 318/572 |

(Continued)

FOREIGN PATENT DOCUMENTS

| CN | 1848011 A | 10/2006 |
|---|---|---|
| JP | S59-177604 A | 10/1984 |

(Continued)

OTHER PUBLICATIONS

Yukihiro et al, Machine Tool, and Control Method of Machine Tool (English translation), JP2009-282625A, Mar. 12, 2009, pp. 19.*

(Continued)

*Primary Examiner* — Suresh Suryawanshi
(74) *Attorney, Agent, or Firm* — Drinker Biddle & Reath LLP

(57) ABSTRACT

A numerical controller controls a position of a control axis in synchronization with a reference value by using tabular data. When the numerical controller sequentially reads a command block from the tabular data and analyzes the command block so as to acquire a reference value and a coordinate value of a control point, the numerical controller outputs a reference value of the control point, which is shifted based on a shift amount specified by a shift command, in command blocks subsequent to the command block which includes the shift command, in a case where the shift command for shifting a reference value is included in the read command block.

8 Claims, 8 Drawing Sheets

(56) References Cited

U.S. PATENT DOCUMENTS

| | | | | |
|---|---|---|---|---|
| 7,905,691 B2* | 3/2011 | Hon | ................... | G05B 19/4015 |
| | | | | 318/602 |
| 8,195,325 B2* | 6/2012 | Hosokawa | ............. | G05B 19/19 |
| | | | | 700/173 |
| 9,696,712 B2* | 7/2017 | Kanemaru | ............ | G05B 19/402 |
| 9,715,225 B2* | 7/2017 | Haraguchi | ............ | G05B 19/19 |
| 2003/0191553 A1 | 10/2003 | Isohata | | |
| 2007/0185609 A1* | 8/2007 | Endo | ................. | G05B 19/4103 |
| | | | | 700/187 |
| 2008/0082203 A1* | 4/2008 | Watanabe | ........ | G05B 19/40937 |
| | | | | 700/187 |
| 2012/0283879 A1* | 11/2012 | Takeuchi | ........... | G05B 19/4155 |
| | | | | 700/275 |
| 2016/0187868 A1* | 6/2016 | Kanemaru | .......... | G05B 19/4103 |
| | | | | 700/56 |

FOREIGN PATENT DOCUMENTS

| | | | | | |
|---|---|---|---|---|---|
| JP | 61127008 A | * | 6/1986 | ......... | G05B 19/4069 |
| JP | 63066609 A | * | 3/1988 | | |
| JP | S63-077637 A | | 4/1988 | | |
| JP | 01134507 A | * | 5/1989 | | |
| JP | H04-269187 A | | 9/1992 | | |
| JP | 07230312 A | * | 8/1995 | | |
| JP | 2000259217 A | * | 9/2000 | | |
| JP | 2001255914 A | * | 9/2001 | | |
| JP | 2003-303005 A | | 10/2003 | | |
| JP | 2009-282625 A | | 12/2009 | | |
| JP | 2010015359 A | * | 1/2010 | ......... | G05B 19/4155 |
| JP | 2013-035054 A | | 2/2013 | | |

OTHER PUBLICATIONS

Notification of Reasons for Refusal dated May 23, 2017 in Japanese Patent Application No. 2015-086642 (3 pages) with an English translation (3 pages).

The Notification of the First Office Action dated Mar. 30, 2018 in Chinese Patent Application No. 2016102520832 (5 pages) with an English translation (7 pages).

* cited by examiner

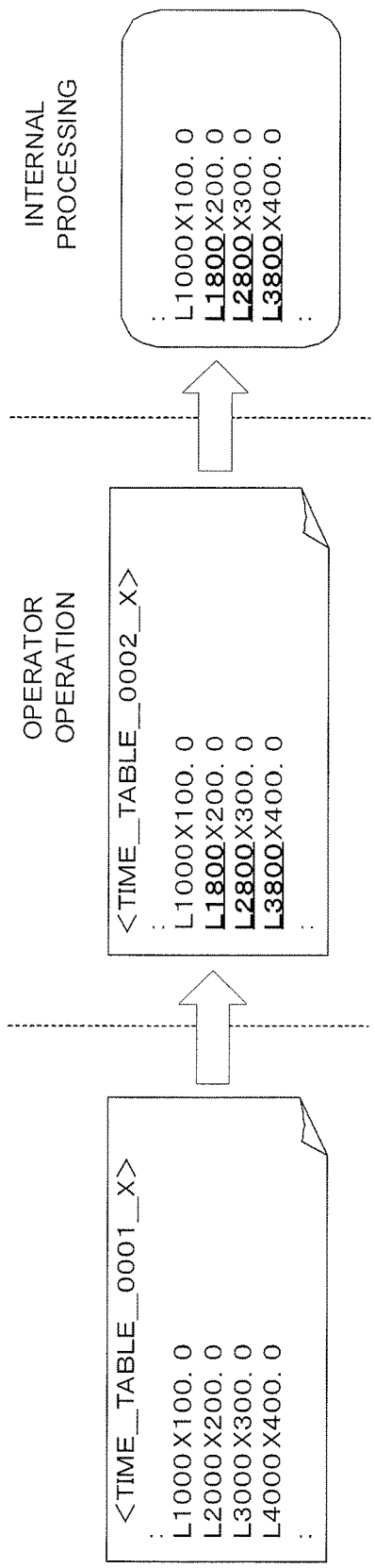
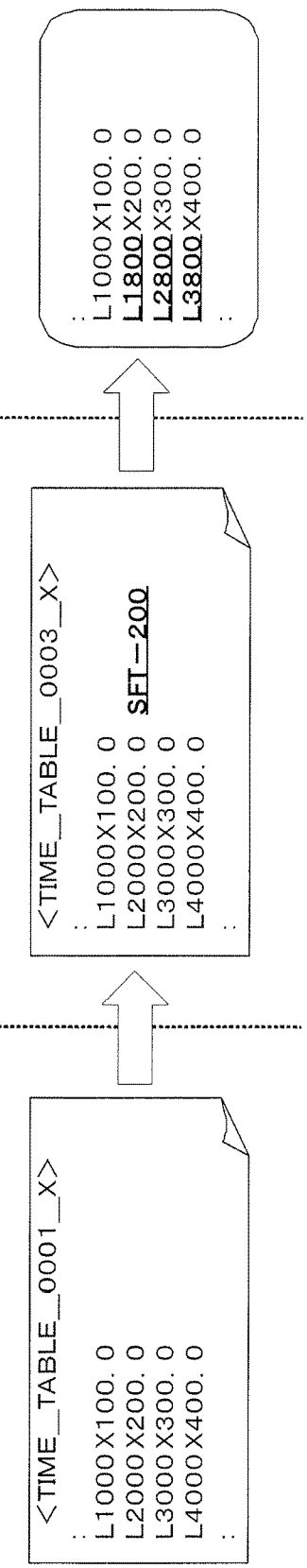

FIG.2A   DESCRIPTION EXAMPLE OF SHIFT COMMAND

```
        <TIME_TABLE_0004_X>
  :
  L1000      X100.0
  L2000      X200.0      SFT-200
  L3000      X300.0
  :
```

FIG.2B   DESCRIPTION EXAMPLE OF SHIFT AMOUNT SPECIFICATION BY SIGNAL ADDRESS

```
        <TIME_TABLE_0004_X>
  :
  L1000      X100.0
  L2000      X200.0      SFT=R1001
  L3000      X300.0
  :
```

FIG.2C   DESCRIPTION EXAMPLE OF SHIFT CANNEL COMMAND

```
        <TIME_TABLE_0004_X>
  :
  L1000      X100.0
  L2000      X200.0      SFT-500
  L3000      X300.0      SFTCAN
  L4000      X400.0
  :
```

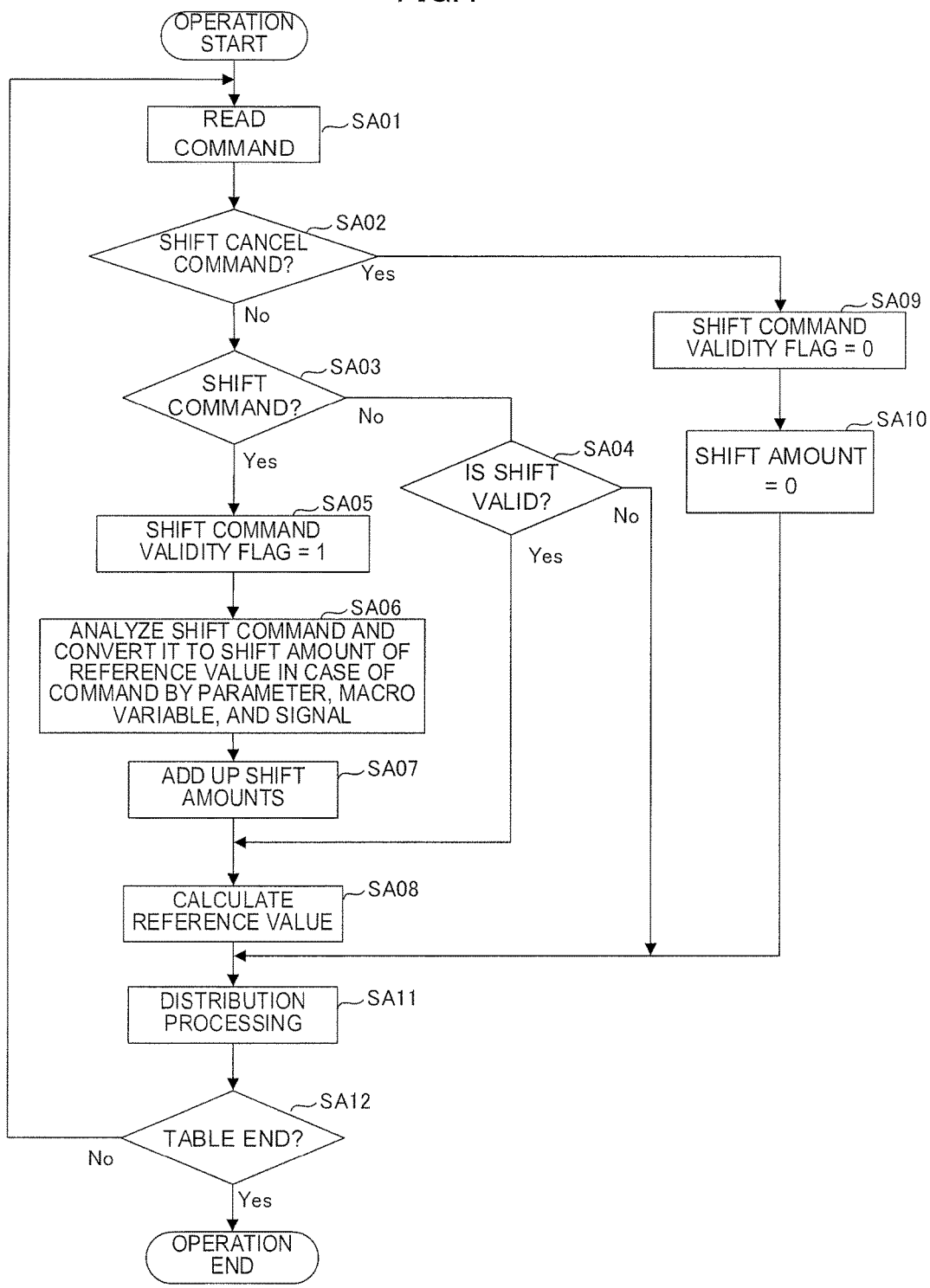

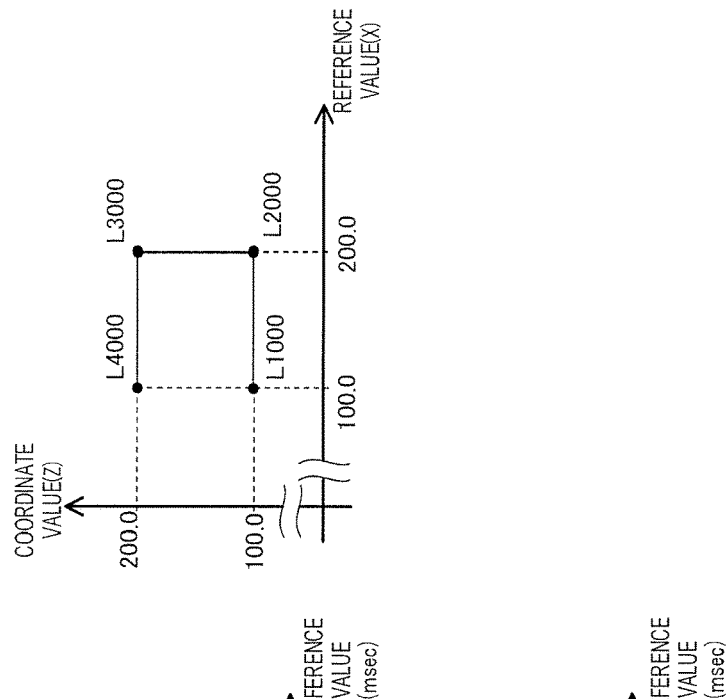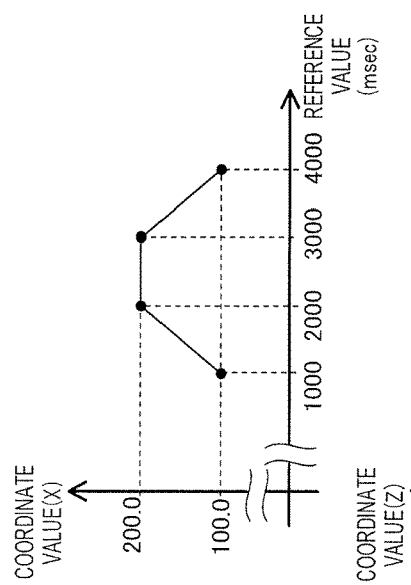

NUMERICAL CONTROLLER OPERATING BASED ON TABULAR DATA

RELATED APPLICATION DATA

This application claims priority under 35 U.S.C. § 119 and/or § 365 to Japanese Application No. 2015-086642 filed Apr. 21, 2015, the entire contents is incorporated herein by reference.

BACKGROUND OF THE INVENTION

1. Field of the Invention

The present invention relates to a numerical controller and especially relates to a numerical controller which enables modification of a reference value of a specific control point while maintaining a difference between reference values of control points.

2. Description of the Related Art

As a method for driving and controlling respective control axes in synchronization with a motion of a reference axis, an operation function based on tabular data is well known in which positional information of control axes is preliminarily stored in tabular data in association with a position of a reference axis and respective control axes are operated in synchronization with the reference axis based on the information stored in the tabular data. In this operation function, tabular data in which a position of an axis or an auxiliary function such as an M code based on time, an axis position, or a spindle position are set is preliminarily stored in a memory or a storage device connected through a network and respective axes and the auxiliary function are controlled while sequentially reading the tabular data.

In Japanese Patent Application Laid-Open No. 59-177604 and Japanese Patent Application Laid-Open No. 2003-303005, a path table operation function utilizing the operation function based on tabular data or a numerical controller which is called an electronic cam controller is disclosed. Accordingly, a movement of a tool free from a machining program is enabled and reduction in machining time and increase in machining precision can be realized.

In a conventional operation based on tabular data, reference values described in tabular data and coordinate values of an axis or a spindle, which correspond to the reference values, are set as control points and a movement amount is calculated based on the two control points which are set as a start point and an end point. Specifically, from a reference value and a coordinate value of an axis or a spindle on a control point which is a start point and a reference value and a coordinate value of an axis or a spindle on a control point which is an end point, a differences of reference values and a difference of coordinate values of an axis or a spindle between two points are calculated, and a movement amount per unit reference value is calculated.

FIG. 7 illustrates an example of conventional axis control using tabular data.

Tabular data <TIME_TABLE_0001_X> is set as tabular data which controls an X axis based on time. L denotes a reference value (reference time: millisecond (msec) unit) and X denotes a coordinate value (millimeter (mm) unit) of the X axis, which corresponds to the reference value. When a current reference value is 1000 msec, the X axis moves between two control points which are a start point on a reference value 1000 msec and a coordinate value 100.0 mm and an end point on a reference value 2000 msec and a coordinate value 200.0 mm.

FIG. 8 is a schematic block diagram illustrating a numerical controller for calculating a movement amount.

In a numerical controller 100 of a prior art technique, command blocks which are sequentially read by a read unit (not illustrated) are notified to a distribution processing unit 130 as two control points which are a start point and an end point, a movement amount per unit reference value is obtained at the distribution processing unit 130 from a difference of reference values between the two control points and a difference of coordinate values between the two control points, and the obtained movement amount is notified to a motor control unit (not illustrated).

In the example of the X axis control using the tabular data <TIME_TABLE_0001_X>, a start point is set on the reference value 1000 msec and the coordinate value 100.0 mm, an end point is set on the reference value 2000 msec and the coordinate value 200.0 mm, and a movement amount per unit reference value can be calculated, in the distribution processing unit 130, as 0.1 mm/1 msec from the difference of the reference values, which is 1000 msec (=2000 msec-1000 msec) and the difference of the coordinate values, which is 100.0 mm (=200.0 mm-100.0 mm).

In such conventional operation based on tabular data, when a reference value on a certain control point is changed, a difference between the reference value of the control point and a reference value of a next control point is changed disadvantageously. Therefore, it is necessary to change all reference values of subsequent control points, based on the changed reference value of the control point, so as not to change a difference of reference values between control points (that is, so as not to change a movement amount per unit reference value).

FIG. 9 illustrates tabular data <TIME_TABLE_0002_X> which is obtained by changing a reference value L2000 of tabular data <TIME_TABLE_0001_X> to a reference value L1800, as an example. When <1> of the tabular data <TIME_TABLE_0002_X> is modified, L3000 and L4000 need to be modified to L2800 (<2>) and L3800 (<3>) respectively so as not to change the difference between reference values of <1> and <2> and the difference between reference values of <2> and <3>.

When such change is performed, an operator modifies respective data while taking into account differences of reference values between control points. However, the change requires time because it is necessary to perform the modification while checking a plurality of numerical values and thus, there is a problem in that a heavy load is imposed on an operator.

Here, in the prior art technique, even though a reference value of a specific control point is modified, a difference between the modified reference value of the specific control point and reference values of the subsequent control points is not changed in a case of an incremental command. However, absolute commands are often used for reference values in tabular data so as to take a view of a whole cycle time and to produce tabular data synchronized among paths and control axes. Thus, simply using incremental commands could not solve the afore-mentioned problem.

SUMMARY OF THE INVENTION

An object of the present invention is to provide a numerical controller which enables modification of a reference value of a specific control point while maintaining a difference of reference values between control points.

A numerical controller according to the present invention controls a position of a control axis in synchronization with a reference value by using tabular data for instructing a position of each control axis based on the reference value which is a time, a position of an axis, or a position of a spindle. The numerical controller includes: a read unit which sequentially reads a command block from the tabular data and analyzes the command block so as to acquire and output a reference value and a coordinate value of a control point; a reference value analysis unit which makes, if a command block read by the read unit includes a shift command for shifting a reference value, the shift of reference value valid in command blocks subsequent to the command block, and outputs the reference value of the control point which is shifted based on a shift amount specified by the shift command; and a distribution processing unit which produces a movement amount for an axis to be controlled by the tabular data, based on the reference value outputted by the reference value analysis unit and the coordinate value of the control point outputted by the read unit. The reference value analysis unit is configured to directly output the reference value of the control point which is outputted by the read unit if the shift of a reference value is invalid.

The shift amount which may be specified by the shift command is indirectly specified by a parameter, a macro variable, or a signal.

The reference value analysis unit may be configured to add the shift amount specified by the shift command to a current shift amount, in a case where the command block, which is read by the read unit when shift of a reference value is valid, includes a shift command for shifting a reference value.

The reference value analysis unit may be configured to make shift of a reference value invalid in command blocks subsequent to a command block which includes a shift cancel command, in a case where the shift cancel command is included in the command block which is read by the read unit.

According to the present invention, a reference value of a specific control point can be modified while maintaining a difference of reference values between control points. As a result, editing of produced tabular data is facilitated so as to exhibit an advantageous effect on start-up of a machine and reduction in adjustment time. Further, by specifying a reference value on a specific control point by a parameter, a macro variable, or a signal state, adjustment of a reference value is made easier without modifying tabular data. Furthermore, by shifting a reference value, setting of an inward turning amount, on a corner portion and adjustment in overlap timing are made easier.

BRIEF DESCRIPTION OF THE DRAWINGS

The above-described and other objects and features of the present invention will be apparent from the following description of an embodiment in reference to the accompanying drawings. Among these drawings:

FIG. 1A illustrates a method for modifying a reference value of a control point according to a prior art technique;

FIG. 1B illustrates a method for modifying a reference value of a control point which is performed by a numerical controller according to the present invention;

FIG. 2A illustrates an example of description of a shift command by which a shift amount of a reference value is specified;

FIG. 2B illustrates an example of description of shift amount specification in which a reference value is specified by a signal address;

FIG. 2C illustrates an example of description of a shift cancel command for cancelling a shift amount which is specified by a shift command;

FIG. 4 is a flowchart illustrating a flow of processing which is executed on the numerical controller illustrated in FIG. 3;

FIG. 5A illustrates a first example of tabular data which defines positional information on an X axis and a Z axis with respect to a reference axis;

FIG. 5B illustrates coordinate values which are respectively taken on the X axis and the Z axis with respect to the reference axis in the case where an operation is performed based on the tabular data illustrated in FIG. 5A;

FIG. 5C illustrates a tool path on an XZ plane in the case where a tool moves while taking coordinate values illustrated in FIG. 5B respectively on the X axis and the Z axis;

DETAILED DESCRIPTION OF THE PREFERRED EMBODIMENT

Figure 3:
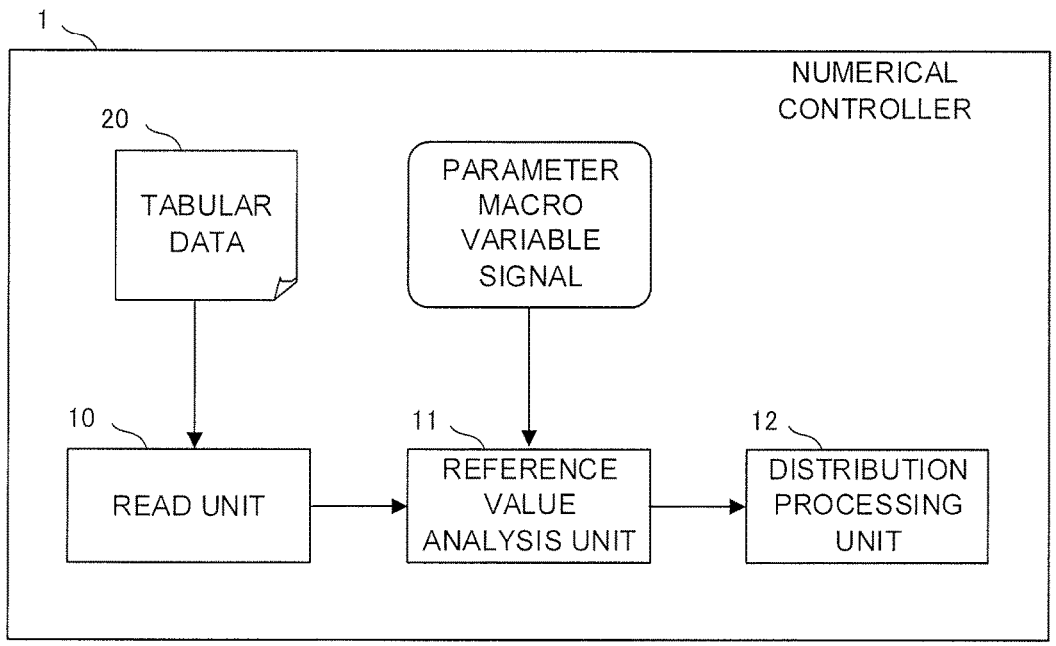
FIG. 3 is a schematic block diagram illustrating a numerical controller according to an embodiment of the present invention.
Figure 7:
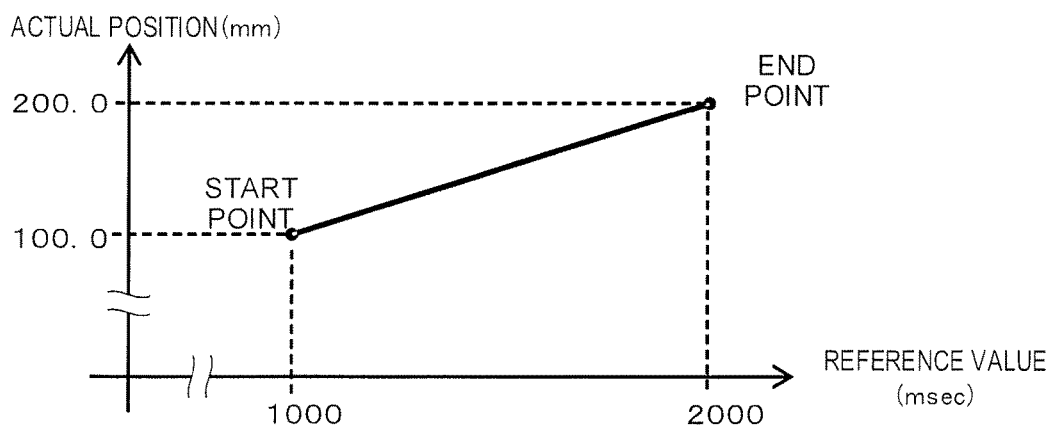
FIG. 7 illustrates an example of conventional axis control using tabular data.

In the present invention, a reference value on a specific control point can be modified while maintaining a difference of reference values between control points. For achieving such modification of a reference value on a specific control point, a technique is provided which adds a shift command (an SFT command) and a shift cancel command (an SFT-CAN command) of a reference value and specifies a modification amount of the reference value to shift reference values of subsequent control points by the modification amount, thereby solving the above-mentioned problem.

FIG. 1A illustrates a method for modifying a reference value of a control point according to a prior art technique. FIG. 1B illustrates a method for modifying a reference value of a control point which is performed by a numerical controller according to the present invention.

In the prior art technique, an operator modifies all reference values in tabular data, modifying L2000, L3000 and L4000 into L1800, L2800 and L3800, respectively, as illustrated in FIG. 1A. However, merely specifying a shift amount with respect to a reference value of a control point to be modified, by using a shift command, as illustrated in FIG. 1B, the numerical controller according to the present invention shifts reference values of control points subsequent to a control point on which the shift amount is specified, by an amount of shift, in internal processing.

FIGS. 2A to 2C illustrate description examples of a shift command and a shift cancel command according to the present invention.

FIG. 2A illustrates an example of description of a shift command by which a shift amount of a reference value is specified. Thus, directly specifying a shift amount by a numerical value, processing is performed such that reference values are shifted by the specified shift amount (SFT-200 in FIG. 2A) in command lines subsequent to the command line on which the shift command is described. Here, if a shift command is issued while shifting reference values by a previous shift command, the shift amounts are added up.

Further, the shift amount can be indirectly specified by a parameter, a macro variable or a signal. When specifying the shift amount by a parameter, a macro variable, or a signal, such a parameter, macro variable or signal address which is to be specified is connected by "=" after a SFT command, for example. FIG. 2B illustrates an example of description of shift amount specification in which a reference value is specified by a signal address. In this example, the shift amount is specified by the 1001st signal (R1001) of an address R, which is an internal relay. When the corresponding command is read, a specified signal state (a signal state of R1001) is read after analysis of a shift command and the read signal state is converted into a shift amount.

A shift cancel command (an SFTCAN command) is now described. When the shift amount which is specified by the above-described shift command is cancelled, a shift cancel command (an SFTCAN command) is described on an end of a command line on which the shift amount is cancelled, as illustrated in FIG. 2C. By such description, the shift amount is cleared to be zero after the time point at which the command line is processed. In FIG. 2C, a shift command (the shift amount −500) is described on a command line L2000 X200.0, so that L2000 X200.0 is shifted to L1500 X200.0 on this command line. While, a shift cancel command is described on a command line L3000 X300.0, so that the shift amount is cleared to be zero when this command line is processed and movement is performed in accordance with the command of L3000 X300.0 to an end point on a reference value 3000 msec and a coordinate value 300.0 mm.

FIG. 3 is a functional block diagram illustrating a numerical controller, according to an embodiment of the present invention, which is capable of executing the above-described shift command and shift cancel command.

In a prior art technique, a read unit 10 reads tabular data 20 from a memory (not illustrated) or the like so as to read a reference value and a coordinate value of a control point and directly notifies a distribution processing unit 12 of the reference value and the coordinate value. In the present invention, a reference value analysis unit 11 is newly provided and the reference value analysis unit 11 shifts a reference value, which is read by the read unit 10, of a control point by the shift amount which is specified and transmits the shifted reference value to the distribution processing unit 12.

The reference value analysis unit 11 analyzes a shift command and a shift cancel command and calculates a reference value of a control point.

When a shift command is included in a block which is read by the read unit 10, the reference value analysis unit 11 changes a shift command validity flag which is provided on a memory (not illustrated) into valid and adds up the shift amount instructed by the shift command to a shift amount storage region which is provided on the memory (not illustrated). Here, in a state in which the shift command validity flag is invalid, 0 is set in the shift amount storage region. If a shift command is issued in a state in which a reference value is not shifted, the shift amount instructed by the shift command is set in the shift amount storage region.

At this time, in the case where the shift amount is directly specified, the reference value analysis unit 11 stores or adds up the specified shift amount in the shift amount storage region. While, in the case where the shift amount is indirectly specified by a parameter, a macro variable or a signal, the reference value analysis unit 11 reads the specified parameter, macro variable or signal and converts the specified parameter, macro variable or signal into the shift amount of a reference value so as to store or add up the shift amount in the shift amount storage region.

Further, in the case where a shift cancel command is included in a block which is read by the read unit 10, the reference value analysis unit 11 clears the shift amount which is stored in the shift amount storage region to zero. Here, in the case where a shift cancel command is included in a block which is read, the reference value analysis unit 11 may reset actual time of a reference value by the shift amount instead of clearing the shift amount which is stored in the shift amount storage region to zero as described above.

In the case where the shift command validity flag is valid after the analysis of a command is thus performed, the reference value analysis unit 11 shifts the reference value of the control point, which is read by the read unit 10, based on the shift amount which is stored in the shift amount storage region and outputs the result to the distribution processing unit 12 as the reference value of the control point with a coordinate value of the control point. Here, in the case where the shift command validity flag is invalid, the reference value analysis unit 11 directly outputs the reference value of the control point, which is read by the read unit 10, to the distribution processing unit 12, together with a coordinate value of the control point.

Then, the distribution processing unit 12 distributes movement amounts of respective axes as movement amounts which are instructed with respect to movable portions of respective axes in every distribution period based on the reference value and the coordinate value of the control point which are received from the reference value analysis unit 11. Then, respective axes are controlled based on the distributed movement amounts.

FIG. 4 is a flowchart illustrating a flow of control processing, which is executed on a numerical controller 1 according to the present embodiment, based on tabular data.

[Step SA01] The read unit 10 sequentially reads each command block from tabular data which is stored in a memory or the like and analyzes the command block which is read so as to acquire and output a reference value and a coordinate value of a control point.

[Step SA02] The reference value analysis unit 11 determines whether or not a shift cancel command is included in the command block which is read in step SA01. When a shift cancel command is included, the process proceeds to step SA09. When a shift cancel command is not included, the process proceeds to step SA03.

[Step SA03] The reference value analysis unit 11 determines whether or not a shift command is included in the command block which is read in step SA01. When a shift command is included, the process proceeds to step SA05. When a shift command is not included, the process proceeds to step SA04.

[Step SA04] The reference value analysis unit 11 refers to the shift command validity flag and determines whether or not shift of a reference value is valid. When the shift is valid, the process proceeds to step SA08. When the shift is invalid, the reference value of the control point is set as a reference value of a control point which is instructed by the command block and the process proceeds to step SA11.

[Step SA05] The reference value analysis unit 11 sets a valid value 1 on the shift command validity flag so as to make the shift of a reference value valid.

[Step SA06] The reference value analysis unit 11 analyzes the shift command. In the case where the shift amount is directly specified, the reference value analysis unit 11 sets the specified value as the shift amount of a reference value. In the case where the shift amount is indirectly specified by a parameter, a macro variable or a signal, the reference value analysis unit 11 converts values acquired from the parameter, the macro variable or the signal into the shift amount of a reference value.

[Step SA07] The reference value analysis unit 11 adds up the shift amount of a reference value, which is obtained in step SA06, in the shift amount storage region.

[Step SA08] The reference value analysis unit 11 obtains a value by shifting the reference value of the control point, which is acquired in step SA01, by the shift amount of a reference value which is stored in the shift amount storage region, as a reference value.

[Step SA09] The reference value analysis unit 11 sets an invalid value 0 in the shift command validity flag so as to make the shift of a reference value invalid.

[Step SA10] The reference value analysis unit 11 clears the shift amount of a reference value, which is stored in the shift amount storage region, to zero and sets the reference value of the control point as a reference value of a control point to be instructed by the command block. Then, the process proceeds to step SA11.

[Step SA11] The distribution processing unit 12 executes distribution processing based on the reference value and the coordinate value of the control point and respective axes are controlled and operated based on the result of the distribution processing.

[Step SA12] Whether or not the tabular data is ended is determined. When the tabular data is ended, the operation processing is ended. When the tabular data is not ended, the process returns to step SA01 and the operation processing is continued.

A specific operation example of the numerical controller 1 according to the present invention is illustrated in FIGS. 5A to 5C and FIGS. 6A to 6C.

FIGS. 5A to 5C illustrate a tool path, on an XZ plane, of a tool which is controlled based on tabular data. In the case where operation is performed based on tabular data which defines positional information on the X axis and the Z axis with respect to a reference axis, as illustrated in FIG. 5A, a tool moves with respect to the reference axis on the X axis and the Z axis while taking coordinate values illustrated in FIG. 5B and a tool path which has corners on the XZ plane is obtained as illustrated in FIG. 5C.

Figures 6A, 6B, 6C:
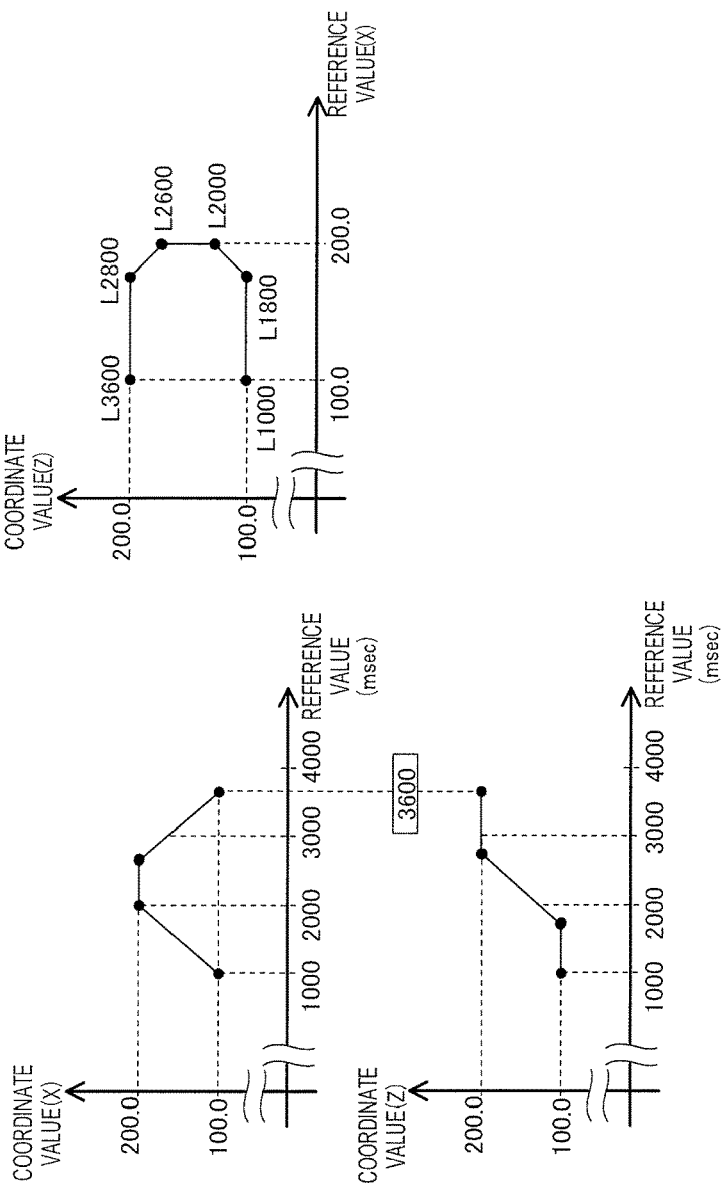
FIG. 6A illustrates a second example of tabular data which defines positional information on the X axis and the Z axis with respect to a reference axis and in which a shift command for instructing a shift amount by a macro variable is inserted.
FIG. 6B illustrates coordinate values which are respectively taken on the X axis and the Z axis with respect to the reference axis in the case where an operation is performed based on the tabular data illustrated in FIG. 6A.
FIG. 6C illustrates a tool path on the XZ plane in the case where a tool moves while taking coordinate values illustrated in FIG. 6B respectively on the X axis and the Z axis.
Figure 8:
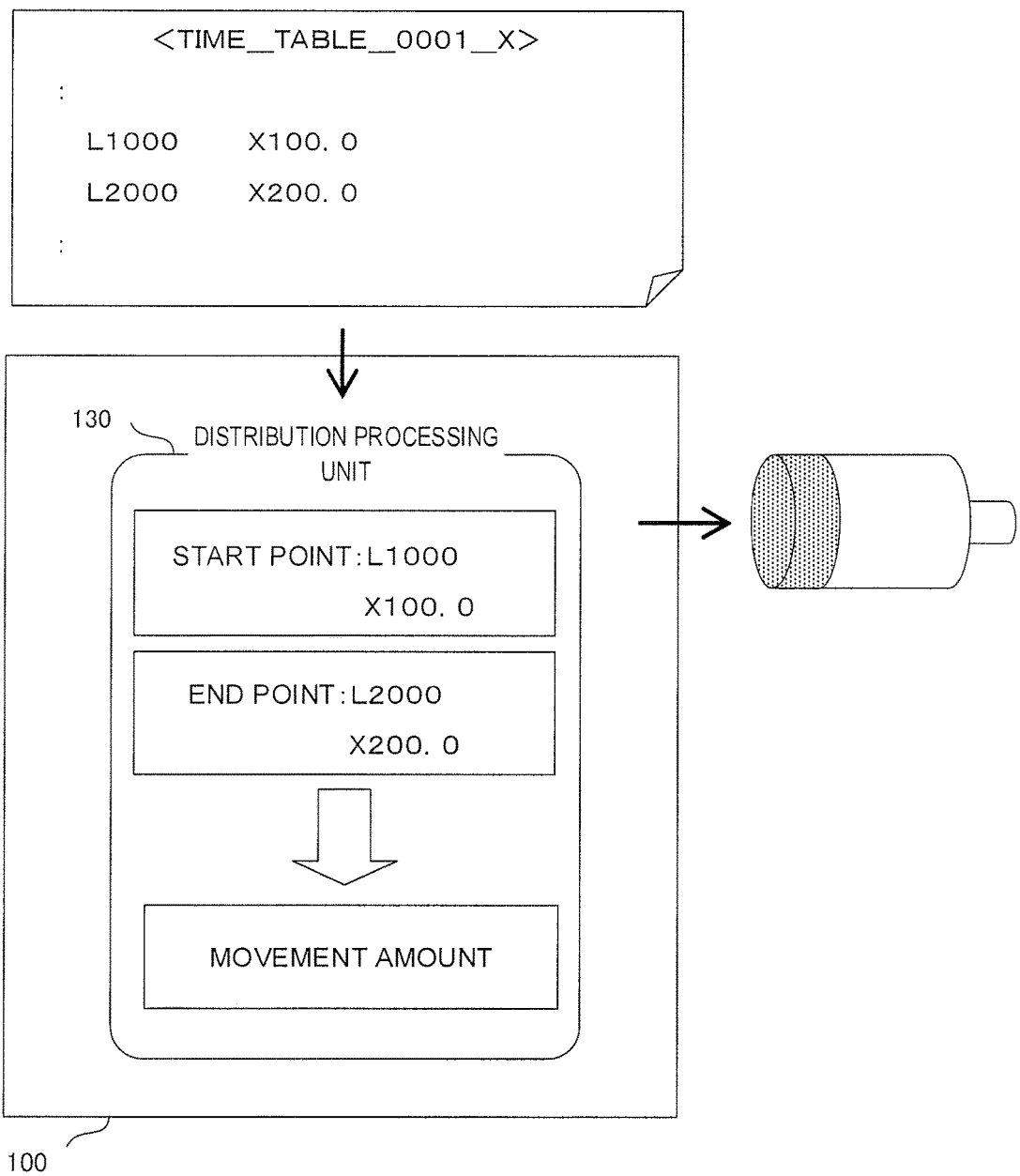
FIG. 8 is a schematic block diagram illustrating a conventional numerical controller for calculating a movement amount.
Figure 9:
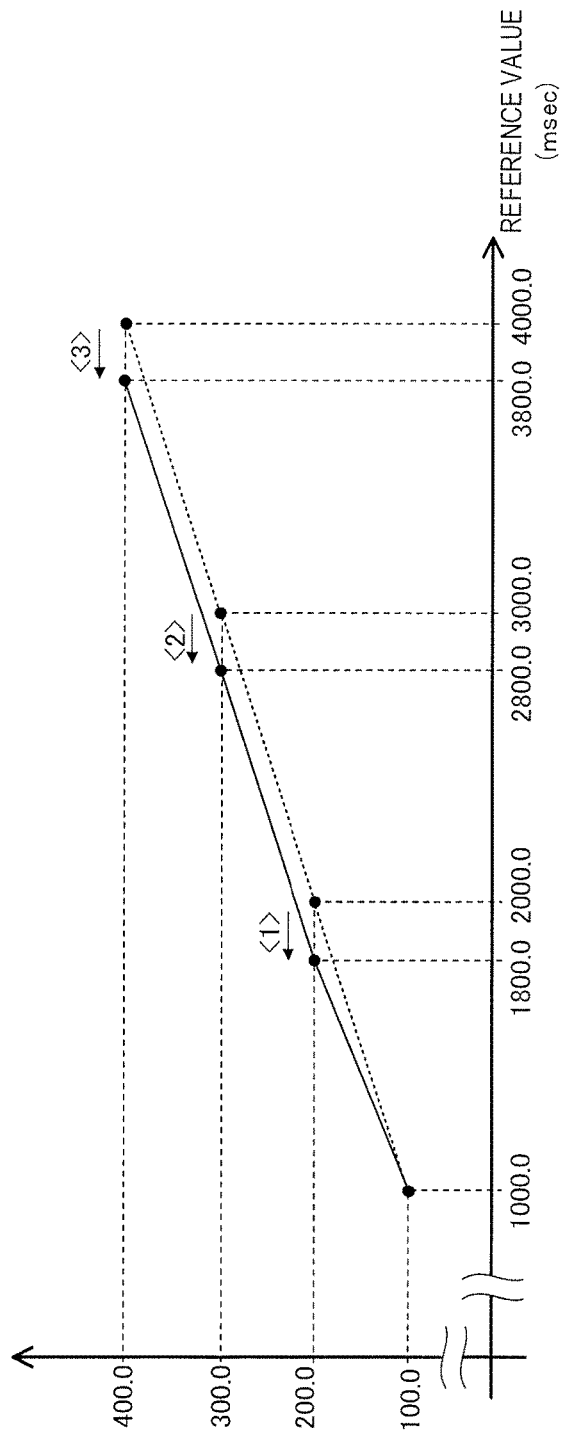
FIG. 9 illustrates examples of tabular data before modification and tabular data after the modification in the case where a reference value of conventional tabular data is modified.

Here, for making a cycle time shorter by performing an inward turning control so that a tool moves along the tool path illustrated in FIG. 6C, with respect to the tool path illustrated in FIG. 5C, a shift command for instructing a shift amount by macro variables is inserted in tabular data as illustrated in FIG. 6A, by using the technique of the present invention, and the following values are set to macro variables.

501=−200: An operation on the Z axis is preceded by −200.

502=−400: An operation on the X axis is preceded by −400.

(the preceding amount of the operation on the Z axis (−200) plus the preceding amount of the operation on the X axis (−200))

503=−200: An operation on the Z axis is preceded by −200.

(the preceding amount of the operation on the X axis (−200) is reflected)

Here, a relation of reference values which are preceded is expressed as following.

502 (preceding amount of the operation on the X axis)= #501+#503 (preceding amount of the operation on the Z axis)

Thus, the tabular data is modified and macro variables are set. As a result, movement of a tool is completed approximately at a reference value L3600 in terms of actual time and thus, the cycle time is shortened as a whole.

The embodiment of the present invention has been described above. However, the present invention is not limited only to the examples of the above-described embodiment but the present invention can be embodied in various aspects by making arbitrary alterations.

For example, the shift cancel is performed by clearing the shift amount to zero in the above-described embodiment. Alternatively, the shift cancel can be performed by resetting actual time of a reference value by the shift amount. In this case, command of L3000 X300.0 causes a movement with reference value 2500 msec and coordinate value 300.0 mm, and command of L4000 X400.0 causes a movement with reference value 3500 msec and reference value 400.0 mm.

Further, in the above-described embodiment, the example in which time is used as a reference value is described. However, other values can be used as a reference value and a position of a reference axis or a position of a spindle can be used, for example.

The invention claimed is:

1. A numerical controller which controls a position of a control axis in synchronization with a reference value by using tabular data for instructing a position of each control axis based on the reference value which is a time, a position of an axis, or a position of a spindle, the numerical controller comprising:

non-transitory computer readable memory;

one or more hardware processors coupled to the non-transitory memory and configured to read instructions from the non-transitory memory to cause the numerical controller to perform operations comprising:

sequentially reading a command block from the tabular data and analyzing the command block so as to acquire and output a reference value and a coordinate value of a control point;

making, if a command block includes a shift command for shifting a reference value, the shift of reference value valid in command blocks subsequent to the command block, and outputting the reference value of the control point which is shifted based on a shift amount specified by the shift command; and producing a movement amount for an axis to be controlled by the tabular data, based on the reference value outputted and the coordinate value of the control point outputted; wherein the reference value of the control point is outputted if the shift of a reference value is invalid.

2. The numerical controller according to claim 1, wherein the shift amount which is specified by the shift command is indirectly specified by a parameter, a macro variable, or a signal.

3. The numerical controller according to claim 1, wherein the shift amount specified by the shift command to a current shift amount is added, in a case where the command block, which is read when shift of a reference value is valid, includes a shift command for shifting a reference value.

4. The numerical controller according to claim 1, wherein shift of a reference value is made invalid in command blocks subsequent to a command block which includes a shift cancel command, in a case where the shift cancel command is included in the command block which is read.

5. The numerical controller according to claim 2, wherein the shift amount specified by the shift command is added to a current shift amount, in a case where the command block, which is read when shift of a reference value is valid, includes a shift command for shifting a reference value.

6. The numerical controller according to claim 2, wherein shift of a reference value is made invalid in command blocks subsequent to a command block which includes a shift cancel command, in a case where the shift cancel command is included in the command block which is read.

7. The numerical controller according to claim 3, wherein shift of a reference value is made invalid in command blocks subsequent to a command block which includes a shift cancel command, in a case where the shift cancel command is included in the command block which is read.

8. The numerical controller according to claim 5, wherein shift of a reference value is made invalid in command blocks subsequent to a command block which includes a shift cancel command, in a case where the shift cancel command is included in the command block which is read.

* * * * *